Patented Dec. 30, 1930

1,786,529

UNITED STATES PATENT OFFICE

PHILIP H. GROGGINS, OF WASHINGTON, DISTRICT OF COLUMBIA

PROCESS FOR THE PREPARATION OF 2-AMINO-PARA-PHENYL-ORTHO-BENZOYL-BENZOIC ACID

No Drawing.   Application filed August 8, 1929.   Serial No. 384,511.

(GRANTED UNDER THE ACT OF MARCH 3, 1883, AS AMENDED APRIL 30, 1928; 370 O. G. 757)

This application is made under the act approved April 30, 1928, and the invention herein described, may be manufactured and used by and for the Government for governmental purposes without payment to me of any royalty thereon.

I have discovered that 2-amino-para-phenyl-ortho-benzoyl-benzoic acid can be obtained by the replacement of the halogen group in a 2-halogen-para-phenyl-ortho-benzoyl-benzoic acid by an amino group. The chemical reaction is expressed as follows wherein (hlg) represents a halogen atom.

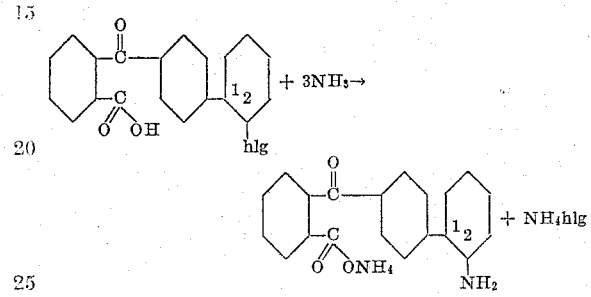

This replacement is accomplished by heating with ammonia under pressure. I have found that copper and its salts may advantageously be used as a catalyst to accelerate the reaction.

When in a fairly pure state, 2-amino-para-phenyl-ortho-benzoyl-benzoic acid is a light yellow crystalline substance, which melts at 193–195° C. It is readily soluble in chlorobenzene and glacial acetic acid. It is only sparingly soluble in benzene or alcohol. It is slightly soluble in boiling dilute acids, the amino salts being pink. With aqueous ammonia or caustic soda, the corresponding yellowish salts are formed which are sparingly soluble in cold water.

Without limiting my invention to any particular procedures, the following examples in which parts by weight are given, illustrate the application of my invention in the preferred forms.

*Example I.*—Seventeen parts of 2-halogen-para-phenyl-ortho-benzoyl-benzoic acid or the equivalent weight of ammonium salt are mixed with 200 parts of 29 percent ammonia and 2 parts of cuprous chloride as catalyst. The mixture is then heated to 210° C. using a pressure autoclave provided with an agitator. The temperature is maintained for 12 hours. The charge is then distilled with steam to remove the ammonia. The yellow ammonium salt is filtered hot and the filtrate acidified with dilute hydrochloric acid to produce the hydrochloride of 2-amino-para-phenyl-ortho-benzoyl-benzoic acid. After warming and filtering, the amino salt is cooled and made exactly neutral with dilute ammonia. The amino keto acid is precipitated as a light yellow flocculent product. The material may be purified by recrystallizing its salts from boiling water. The yield of 2-amino-para-phenyl-ortho-benzoyl-benzoic acid is very high.

*Example II.*—Twenty-five parts of the ammonium salt of 2-halogen-para-phenyl-ortho-benzoyl-benzoic acid are treated with 250 parts of 29 per cent ammonia and 0.25 parts of cuprous chloride. The mixture is heated at 200° C. for 10 hours in an autoclave provided with a stirrer. The excess of ammonia is distilled with steam and the ammonium salt just neutralized with dilute mineral acid. A very fine product with high yield is thus obtained. To further purify, the amino-salt is dissolved in a large quantity of boiling water and filtered. After cooling, dilute alkali is added to just neutralize, and the 2-amino-para-phenyl-ortho-benzoyl-benzoic acid is obtained as a yellow flocculent precipitate of high purity.

*Example III.*—Twenty-five parts of 2-chloro-para-phenyl-ortho-benzoyl-benzoic acid are mixed with 400 parts of 26 per cent ammonia, .05 parts of cuprous chloride and 1 part of copper. The charge is heated in an autoclave provided with a stirrer for 10 hours at 210° C. On cooling the yellow ammonium salt of 2-amino-para-phenyl-ortho-benzoyl-benzoic acid is obtained. When the amino salt is made by treating with dilute cold sulfuric acid; this can be used for the preparation of 2-amino-beta-phenyl-anthraquinone.

I am aware that numerous details of the process may be varied through a wide range without departing from the spirit of this invention, and I do not desire limiting the patent granted hereon otherwise than as necessitated by the prior art.

I claim as my invention—

1. The process of preparing 2-amino-para-phenyl-ortho-benzoyl-benzoic acid, which comprises heating 2-halogen-para-phenyl-ortho-benzoyl-benzoic acid with aqueous ammonia under pressure.

2. The process of preparing 2-amino-para-phenyl-ortho-benzoyl-benzoic acid, which comprises heating 2-halogen-para-phenyl-ortho-benzoyl-benzoic acid with aqueous ammonia under pressure in the presence or a copper catalyst.

3. The process of preparing 2-amino-para-phenyl - ortho - benzoyl - benzoic acid, which comprises heating 2-chloro-para-phenyl-ortho-benzoyl-benzoic acid with aqueous ammonia in the presence of a copper catalyst and then precipitating the amino compound by cooling the ammoniacal solution.

4. As a new article of manufacture 2-amino-para-phenyl-ortho-benzoyl-benzoic acid, having most probably the following chemical formula:

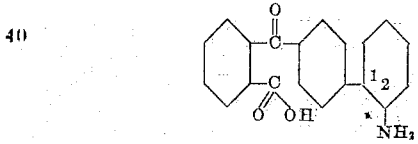

In testimony whereof I have hereunto affixed my name.

PHILIP H. GROGGINS.